United States Patent [19]

Chiu

[11] Patent Number: 5,325,035
[45] Date of Patent: Jun. 28, 1994

[54] CONTROL DEVICE FOR INTERMITTENT OPERATION OF AN INDUCTION MOTOR

[76] Inventor: Yong Ho Chiu, No. 26, Lane 48, Hwai Tei Street, Taipei, Taiwan

[21] Appl. No.: 17,275

[22] Filed: Feb. 12, 1993

[51] Int. Cl.⁵ .............................................. H02P 1/44
[52] U.S. Cl. ...................................... 318/785; 318/797
[58] Field of Search .............. 318/474, 476, 477, 785, 318/789, 779, 797, 453

[56] References Cited

U.S. PATENT DOCUMENTS

| | | | |
|---|---|---|---|
| 4,364,001 | 12/1982 | Heidt et al. | 318/765 X |
| 4,366,425 | 12/1982 | Shen | 318/799 |
| 4,388,581 | 6/1983 | Bhatnagar | 318/789 |
| 4,823,067 | 4/1989 | Weber | 318/799 |
| 5,227,710 | 7/1993 | Lewus | 318/781 |

*Primary Examiner*—William M. Shoop, Jr.
*Assistant Examiner*—Brian Sircus
*Attorney, Agent, or Firm*—Irons, Edward S.

[57] ABSTRACT

A single phase induction motor having a main field winding and an auxiliary field winding provided with a phase advancing capacitor is controlled by a control unit having a timer unit and a by-pass switch for by passing the phase advancing capacitor. The main field winding is provided with a main switch operable by a relay controlled by the timer. The control unit also has a clutch detecting unit which detects the engagement and disengagement of the clutch adapted to couple the motor with a load such as a sewing machine. The timer is so set to activate the relay after a predetermined time period when the clutch is disengaged to relieve the motor of its load, whereby the relay causes the main switch to open, and the by-pass switch to close, such that the motor is operated solely on the auxiliary field winding when no load is applied, so as to save the power consumption at an idling operation.

2 Claims, 2 Drawing Sheets

CONTROL DEVICE FOR INTERMITTENT OPERATION OF AN INDUCTION MOTOR

BACKGROUND OF THE INVENTION

This invention relates to a control device for a single phase induction motor, more particularly an improved control device for controlling the motor for use in driving an apparatus, such as a sewing machine, which is operated intermittently and the load is intermittently applied to the motor.

Conventionally, a sewing machine is driven by a single phase induction motor having a magnetic field circuit containing a main winding and an auxiliary winding; wherein a capacitor is connected to the auxiliary winding to advance the phase of the current passing through the auxiliary winding to facilitate the starting of the motor. The field circuit is normally so designed such that a relatively large amount of the current is allowed to pass through the main winding and thus the major portion of the torque produced by the motor is generated by the main winding. In an earlier type of the single phase induction motor, a switch is provided in the auxiliary winding such that the switch is caused to open as soon as the motor is started and its speed has reached a certain level to cut off the current supplied to the auxiliary winding, leaving the motor to operate solely on the main winding. When either one of such conventional single phase induction motors, with or without a cut off switch, is used for driving a sewing machine, a magnetic clutch is normally employed to couple the motor with the sewing machine. This is because the sewing machine operates intermittently and the motor must be disconnected from the sewing machine instantly when the sewing machine stops, and on the other hand, the motor must be capable of being coupled to the sewing machine immediately when one wishes to operate the sewing machine.

A problem arises as the operation of the motor is maintained solely by the main winding, which draws a relatively large amount of the electric current even when the magnetic clutch is disengaged and the load is not applied onto the motor; a considerable amount of the electric energy is still consumed by the motor while the sewing machine is not operating and the motor is left idling, and such an excessive consumption of electric energy tends to generate heat and noise.

In view of the above-mentioned problems with the conventional single phase induction motor, this application offers an improved control device which reduces electric energy consumption while the motor is operating under a no-load condition.

SUMMARY OF THE INVENTION

The control device for controlling a single phase induction motor according to this invention includes a magnetic field circuit for generating the field flux for the motor having a clutch for coupling the motor to a load as desired, a clutch detecting unit for detecting the engagement and disengagement operations of the clutch, and a control circuit for changing the level of the current supplied to the field circuit in response to the engagement and disengagement operations of the clutch detected by the clutch detecting unit. The field circuit has a main winding with a main switch, an auxiliary winding having a capacitor connected thereto with an auxiliary switch, the capacitor having a by-pass switch operable in association with the auxiliary switch.

The control circuit includes a timer and a relay operable by the timer; the timer is operatively connected to the clutch detecting unit such that the timer is activated when the clutch detecting unit detects the disengagement operation of the clutch. When the timer is activated, the relay is activated after a predetermined period of time to cause the main switch to open, the auxiliary switch to open, and the by pass switch to close, so as to cause the motor to operate solely on the auxiliary winding at no load condition.

BRIEF DESCRIPTION THE DRAWINGS

Figure 4:
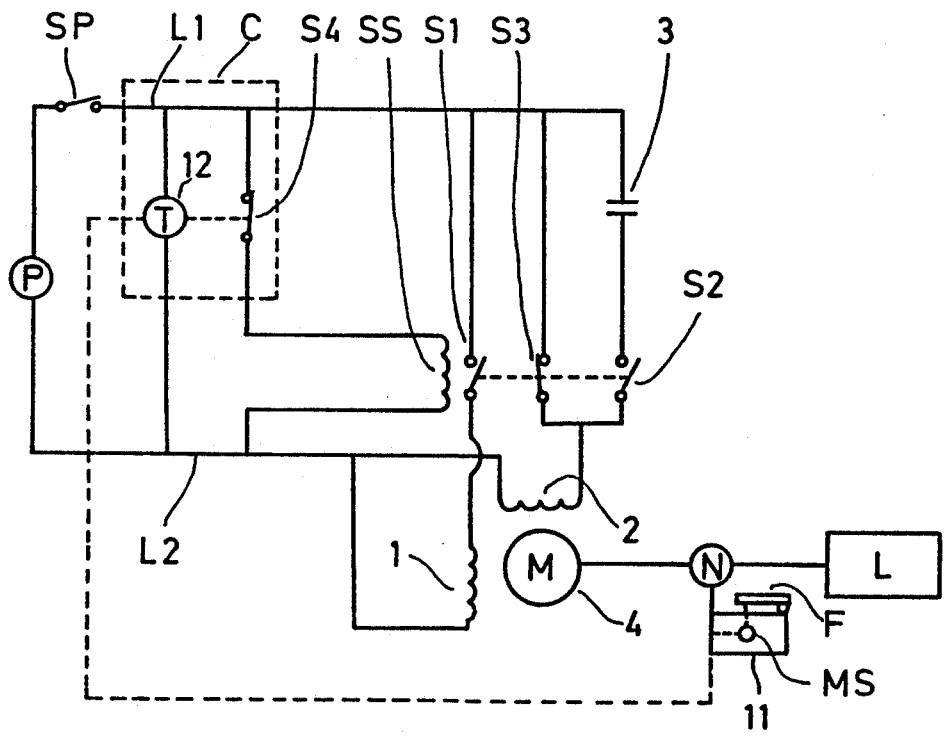

FIG. 4 in another circuit diagram of the control device of the present invention, showing the state that the clutch is enged and the preset time limit is over.

Figure 1:
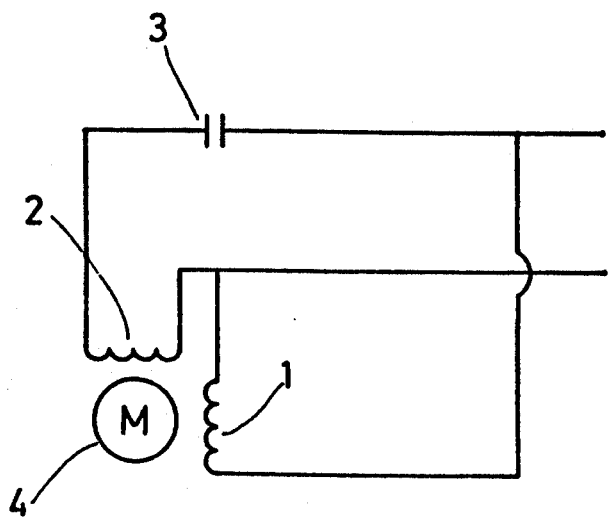
FIG. 1 is an electric circuit diagram of a conventional single phase induction motor.
Figure 2:
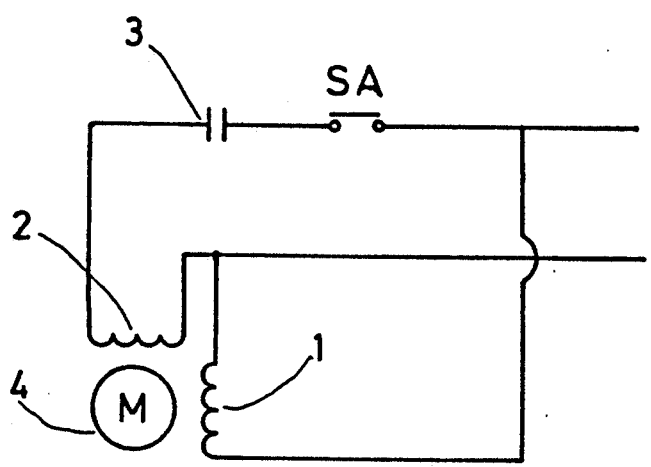
FIG. 2 is an electric circuit diagram of another conventional single phase induction motor.

In FIG. 1 there is shown a circuit diagram of conventional single phase induction motor, wherein 1 is a main field winding, 2 is an auxiliary field winding, 3 is a phase advancing capacitor, and 4 is an armature. FIG. 2 shows a circuit diagram of another conventional single phase induction motor which is similar to that of FIG. 1, except for a switch SA for cutting off the supply of the current to auxiliary field winding 2 as soon as the rotational speed of armature 4 has reached a predetermined level.

DETAILED DESCRIPTION OF A PREFERRED EMBODIMENT

Figure 3:
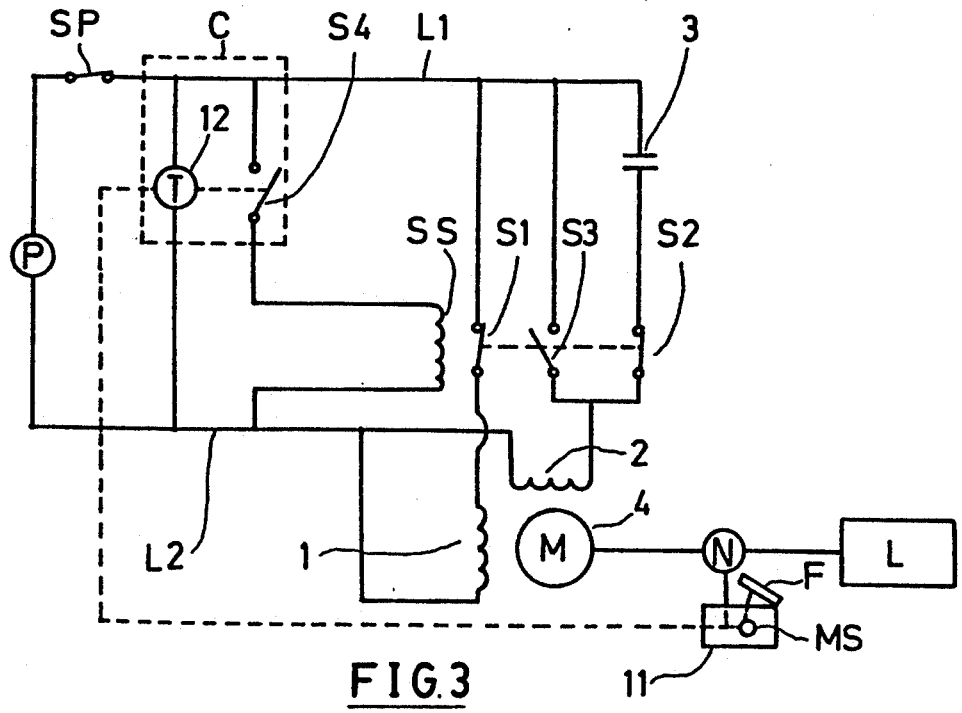
FIG. 3 is an electric circuit diagram of an embodiment of the control device of the present invention, showing the state that the clutch is disengaged and the load is not applied to the motor.

As shown is FIG. 3, an embodiment of the control device for controlling a single phase induction motor of the present invention includes a main field winding 1 shunted across a pair of power supply lines L1, L2 through a main switch S1 operable by a solenoid SS, an auxiliary field winding 2 shunted across the pair of power supply lines L1, L2 through a series connection of an auxiliary switch S2 and a phase advancing capacitor 3, and a by-pass switch S3 connected in parallel with auxiliary switch S2 and phase advancing capacitor 3. The control device further includes a timer unit 12 operable by a clutch detecting unit 11 which detects the engagement and disengagement of clutch N which is adapted to couple motor 4 to a load L such as a sewing machine. Timer unit 12 contains a relay S4 which connects the solenoid SS to the pair of power supply lines L1, L2.

Clutch detecting unit 11 includes a footpedal F for operating clutch N and a microswitch MS operable by footpedal F. When footpedal F is depressed, clutch N is engaged and microswitch MS is closed to activate timer unit 12. When footpedal F is not depressed, clutch N is disengaged and microswitch MS is caused to open, and timer unit 12 is activated for a predetermined time period, and relay S4 is closed after the predetermined time period, e.g., 10 seconds.

Main Switch S1, which is normally closed, is caused to open as soon as relay S4 is closed to energize solenoid SS which is adapted to magnetically operate main switch S1.

Auxiliary switch S2, which is normally closed, is operated in association with main switch S1, such that auxiliary switch S2 is caused to open when main switch S1 is caused to open.

By-pass switch S3, which is normally open, is operated in association with main switch S1 such that by-pass switch S3 is caused to close when main switch S1 is caused to open.

In FIGS. 3 and 4, P is a power source which may be 110 V 60 HZ AC commercial power source, and SP is a power source switch.

The operation of the control device of this invention is described as follows.

As shown in FIG. 3, when footpedal F is not depressed, main switch S1 and auxiliary switch S2 are closed, and by-pass switch S3 is open.

When power source switch SP of FIG. 3 is closed, 110 V AC of the power source P is applied to main field winding 1 and auxiliary field winding 2, to start the rotation of motor 4, with the footpedal F released and clutch N disengaged. The disengagement of clutch N is detected by microswitch MS of clutch detecting 11 and timer unit T, which is set to operate relay S4 after 10 seconds, is actuated.

If clutch N is engaged by depressing footpedal F within 10 seconds to drive the load L, which is a sewing machine, microswitch MS of clutch detecting unit 11 detects the engagement of clutch N and resets Timer unit 12 to stop at the starting position, and the operation of the motor 4 is maintained while main field winding 1 is energized and auxiliary field winding 2 is also energized by AC current supplied through phase advancing capacitor 3 and auxiliary switch S2.

As soon as the sewing machine L is stopped by releasing footpedal F to disengage clutch N, clutch detecting unit 11 detects the disengagement of clutch N and activates Timer 12. When the clutch N is held disengaged for over a preset period of time of 10 seconds, timer unit 12 causes relay S4 to close as shown in FIG. 4. Then solenoid SS is energized to cause main switch S1 to open, auxiliary switch S2 to open, and by-pass switch S3 to close. As a result the supply of current to main field winding 1 is cut off, and the supply of current to auxiliary field winding 2 is caused to by-pass phase advancing capacitor 3 and auxiliary switch S2 and is supplied through by-pass switch S3, and the rotation of motor 4 is maintained solely by the current supplied to auxiliary field winding 2, as shown in FIG. 4.

TEST EXAMPLE 1

A ⅛ HP single phase induction motor equipped with the control device of this invention was tested with a sewing machine as a load applied to the motor through a clutch, as shown in FIGS. 3 and 4.

$W_0$ = No load loss measured: 51 W
$R_m$ = Impedance of the main field winding: 1.6Ω
$I_m$ = Current of the main field winding: 0 A
$I_a$ = Current of the auxiliary field winding: 1.5 A
Operation Conditions: no noise was heard; moderate temperature rise was noted.

COMPARATIVE EXAMPLE 1

The same motor of Test Example 1 was tested without the control device of this invention, as shown in FIG., 1
$W_0$ = 98 W
$R_m$ = 1.6Ω
$I_m$ = 2.5 A
$I_a$ = 1.4 A
Operation Conditions: excessive noise was heard; excessive temperature rise was noted.

TEST EXAMPLE 2

A ⅛ HP single phase induction motor was tested with the control device of this invention
$W_0$ = 70 W
$R_m$ = 0.95Ω
$I_m$ = 0 A
$I_a$ = 2.2 A
Operation Conditions: no noise was heard; moderate temperature rise was noted

COMPARATIVE EXAMPLE 2

The same motor of Test Example 2 without the control device of this was tested
$W_0$ = 145 W
$R_m$ = 0.95Ω
$I_m$ = 3.85 A
$I_a$ = 2.30 A
Operation Conditions: Excessive noise was heard; Excessive temperature rise was noted.

The control device of this invention, as described above with reference to a preferred embodiment illustrated in FIGS. 3 and 4, is extremely useful for such an application as for operating a sewing machine wherein the load is applied to the motor intermittently. More specifically, it is useful in such operation wherein a relatively small part (25-30%) of the total operation time of the motor is used for driving a load (with the clutch engaged to drive the sewing machine) and a relatively large part (70-75%) to the total operation time of the motor is spent with motor idling (with the clutch disengaged); as a result 50% of the electric power at the idling time can be saved. Furthermore, because of the significant saving of electric power at the idling time, less heat is generated by the field winding and the copper loss of the motor is reduced.

Though a microswitch operable with a footpedal for operating the clutch is used as a clutch detecting unit; however, other alternatives, such as a relay electrically connected to a control circuit of the magnetic clutch built within the motor, may be used. And, a delay relay may be used in place of the combination of timer unit 12 and relay S4. Other modifications are possible without departing from the scope of this invention as defined in the appended claims.

What is claimed is:

1. A control device for controlling a single phase induction motor having a main field winding and an auxiliary field winding, the control device comprising:
    detecting means for detecting the loading and unloading of said motor;
    a timer unit operable in association with said detecting means such that said timer unit is activated when said detecting means detects the unloading of said motor, and that said timer unit is reset when said detecting means detecting the loading of said motor;
    switching means operable by said timer unit a predetermined time period after said timer is activated, to cut off the supply of the current to said main field winding and to allow the supply of the current solely to said auxiliary field winding when said motor is operating under no-load conditions.

2. A control device for controlling a single phase induction motor having a main field winding and an auxiliary field winding, to which main field winding and auxiliary field winding an electric current is supplied from a power source, the control device comprising:
- a phase advancing capacitor connected in series with said auxiliary field winding;
- detecting means for detecting the loading and unloading of said motor;
- a timer unit operable in associate with said detecting means, such that said timer unit is activated when said detecting means detects the unloading of said motor, and that said timer unit is reset when said detecting means detecting the loading of said motor;
- switching means operable by said timer unit at or for a predetermined time period after said timer is activated, to cut off the supply of said electric current to said main field winding and to allow the supply of said electric current solely to said auxiliary field winding; said switching means comprising:
- a main switch connected in series with said main field winding;
- an auxiliary switch connecting said phase advancing capacitor and said auxiliary field winding;
- a by-pass switch which by-passes said phase advancing capacitor, and
- a relay normally keeping said main switch closed, said auxiliary switch closed, and said by-pass switch open; said relay being adapted when operated by said timer unit, to cause said main switch to open, said auxiliary switch to open, and said by-pass switch to close.

* * * * *